United States Patent
van Thiel (10) Patent No.: US 12,454,256 B2
(45) Date of Patent: Oct. 28, 2025

(54) METHOD FOR EMERGENCY ENGAGEMENT OF A HOLDING BRAKE, AND ELECTROPNEUMATIC BRAKE SYSTEM

(71) Applicant: ZF CV Systems Global GmbH, Bern (CH)

(72) Inventor: Julian van Thiel, Grossburgwedel (DE)

(73) Assignee: ZF CV Systems Global GmbH, Bern (CH)

(*) Notice: Subject to any disclaimer, the term of this patent is extended or adjusted under 35 U.S.C. 154(b) by 263 days.

(21) Appl. No.: 18/331,791

(22) Filed: Jun. 8, 2023

(65) Prior Publication Data

US 2023/0311828 A1 Oct. 5, 2023

Related U.S. Application Data

(63) Continuation of application No. PCT/EP2021/083277, filed on Nov. 29, 2021.

(30) Foreign Application Priority Data

Dec. 9, 2020 (DE) ...................... 10 2020 132 875.3

(51) Int. Cl.
*B60T 8/94* (2006.01)
*B60T 7/12* (2006.01)
(Continued)

(52) U.S. Cl.
CPC ................. *B60T 8/94* (2013.01); *B60T 7/12* (2013.01); *B60T 8/17* (2013.01); *B60T 8/885* (2013.01);
(Continued)

(58) Field of Classification Search
CPC ... B60T 7/12; B60T 8/17; B60T 8/885; B60T 8/94; B60T 13/04; B60T 13/261;
(Continued)

(56) References Cited

U.S. PATENT DOCUMENTS 6,027,181 A * 2/2000 Lewis ................... B60T 13/665
303/20
9,022,488 B2 5/2015 Beier et al.
(Continued)

FOREIGN PATENT DOCUMENTS

| DE | 10 2006 041 008 A1 | 3/2008 |
| DE | 10 2014 006 615 A1 | 11/2015 |
| DE | 10 2016 005 318 A1 | 11/2017 |
| DE | 10 2017 002 718 A1 | 9/2018 |
| DE | 10 2017 002 719 A1 | 9/2018 |
| EP | 3 283 339 A1 | 2/2018 |

OTHER PUBLICATIONS

English translation and International Preliminary Report on Patentability of the International Bureau of WIPO dated Jun. 13, 2023 for international application PCT/EP2021/083277 on which this application is based.

(Continued)

*Primary Examiner* — Hai H Huynh
*Assistant Examiner* — Johnny H Hoang
(74) *Attorney, Agent, or Firm* — Walter Ottesen, P.A.

(57) ABSTRACT

A method for emergency engagement of a holding brake of a vehicle having an electropneumatic brake system. The electropneumatic brake system includes a service brake system with a service brake and a holding brake system with the holding brake. The holding brake system has spring brake cylinders. The service brake system includes a service brake control unit. The electropneumatic braking system includes at least one brake circuit for the service brake and the holding brake. The service and holding brakes may be in separate brake circuits. The spring brake cylinders can be vented when a supply pressure in at least one brake circuit for the service brake decreases. The method includes reducing, via the service brake control unit, the supply pressure in at least one brake circuit for the service brake under a program control in defined conditions.

29 Claims, 8 Drawing Sheets

(51) Int. Cl.
*B60T 8/17* (2006.01)
*B60T 8/88* (2006.01)
*B60T 13/38* (2006.01)
*B60T 13/66* (2006.01)
*B60T 13/68* (2006.01)
*B60T 17/08* (2006.01)
*B60T 17/22* (2006.01)

(52) U.S. Cl.
CPC ............ *B60T 13/38* (2013.01); *B60T 13/662* (2013.01); *B60T 13/683* (2013.01); *B60T 17/083* (2013.01); *B60T 17/22* (2013.01); *B60T 2210/32* (2013.01); *B60T 2220/04* (2013.01); *B60T 2230/00* (2013.01); *B60T 2250/04* (2013.01); *B60T 2270/402* (2013.01); *B60T 2270/403* (2013.01); *B60T 2270/406* (2013.01)

(58) Field of Classification Search
CPC ...... B60T 13/38; B60T 13/385; B60T 13/662; B60T 13/683; B60T 17/227; B60T 17/12; B60T 17/083; B60T 17/22; B60T 2210/32; B60T 2220/04; B60T 2250/04; B60T 2270/403; B60T 2270/406; B60T 2270/402
USPC .......................................................... 701/70
See application file for complete search history.

(56) References Cited

U.S. PATENT DOCUMENTS

| | | | |
|---|---|---|---|
| 9,944,266 | B2 | 4/2018 | Leinung et al. |
| 11,052,894 | B2* | 7/2021 | Van Thiel ............... B60T 13/68 |
| 11,203,332 | B2* | 12/2021 | Van Thiel ............. B60T 8/3605 |
| 2009/0280959 | A1 | 11/2009 | Bensch et al. |
| 2009/0309413 | A1 | 12/2009 | Bensch et al. |
| 2010/0025141 | A1* | 2/2010 | Bensch ................. B60T 13/683 180/271 |
| 2019/0152459 | A1 | 5/2019 | Dieckmann et al. |
| 2020/0023827 | A1 | 1/2020 | Van Thiel |
| 2020/0070795 | A1 | 3/2020 | Van Thiel |
| 2020/0148180 | A1* | 5/2020 | Van Thiel ............. B60T 13/263 |
| 2020/0361436 | A1* | 11/2020 | Heer .................... B60T 17/002 |
| 2022/0227342 | A1* | 7/2022 | Klostermann .......... B60T 8/171 |
| 2022/0274573 | A1* | 9/2022 | Otremba ............... B60T 13/683 |

OTHER PUBLICATIONS

English translation and Written Opinion of the International Searching Authority dated Feb. 28, 2022 for international application PCT/EP2021/083277 on which this application is based.
International Search Report of the European Patent Office dated Feb. 28, 2022 for international application PCT/EP2021/083277 on which this application is based.

* cited by examiner

METHOD FOR EMERGENCY ENGAGEMENT OF A HOLDING BRAKE, AND ELECTROPNEUMATIC BRAKE SYSTEM

CROSS-REFERENCE TO RELATED APPLICATIONS

This application is a continuation application of international patent application PCT/EP2021/083277, filed Nov. 29, 2021, designating the United States and claiming priority from German application 10 2020 132 875.3, filed Dec. 9, 2020, and the entire content of both applications is incorporated herein by reference.

TECHNICAL FIELD

The disclosure relates to a method for the emergency engagement of a holding brake of a vehicle, wherein a service brake system with a service brake and a holding brake system with the holding brake are components of an electropneumatic brake system, the holding brake system has spring brake cylinders, the service brake system includes a service brake control unit for controlling components of the service brake, at least one brake circuit is provided for the service brake circuit and the holding brake, wherein the brake circuits for the service brake and the holding brake may also be separate, and the spring brake cylinders may be vented when a supply pressure in at least one brake circuit for the service brake reduces.

BACKGROUND

Modern commercial vehicles have an electropneumatic brake system. Part of the brake system has spring brakes as holding brakes. These are also referred to as parking brakes. The holding brakes act by spring force and can be released by ventilation of spring brake cylinders or engaged by venting.

Within the service brake system, valves for regulating the service brake pressure are controlled electronically. The valves may be provided in so-called axle modulators or outside of them.

The holding brakes are also controlled electronically. The ventilation or venting of the spring brake cylinders is regulated by actuating a solenoid valve. For safety reasons, the solenoid valve must always adopt a definite switching position, which must be maintained in the event of a power supply failure. The solenoid valve is therefore configured as a bistable solenoid valve.

The spring brake cylinders can be combined with service brake cylinders so that the spring brake and service brake act on the same brake pistons. Suitable configuration measures may be taken to avoid mechanical overloading of the brake pistons by the addition of braking forces from the service brakes and the spring brakes. If the service brakes are applied while the holding brakes are effective, the spring brake cylinders are simultaneously ventilated in order to avoid the addition of braking forces.

In some markets, for safety reasons, venting of the spring brake cylinders is provided if the supply pressure in the service brake system reduces. The service brake and the holding brake can be assigned to different brake circuits. When different brake circuits are assigned, a so-called bleed-back function ensures that a supply pressure reduction in the brake circuit for the service brake also vents the brake circuit for the spring brake. In some countries, the service brake and holding brake do not have to have separate brake circuits. The brake circuit for the holding brake is then also the brake circuit for the service brake, so that the spring brake cylinders are vented anyway if there is a sudden supply pressure reduction in the brake circuit.

The holding brake must be engageable by the driver. In the event of a fault, the driver is required to vent the spring brake cylinders by deliberately reducing the supply pressure in the brake circuit for the service brake and thus to activate the holding brake. To do this, the driver brakes the vehicle with the service brake, switches off the engine so that the compressed air supply is interrupted, and then applies the service brake several times. As a result, the brake circuit for the service brake is gradually vented. As a result, the spring brake cylinders are also vented. The described process requires the attention and timely intervention of the driver.

SUMMARY

It is an object of the present disclosure to provide a method for emergency engagement of a holding brake, independently of the intervention of the driver.

The aforementioned object can, for example, be achieved via a method according to the disclosure for emergency engagement of a holding brake of a vehicle having an electropneumatic brake system including a service brake system with a service brake and a holding brake system with the holding brake; the holding brake system having spring brake cylinders; the service brake system including a service brake control unit for controlling components of the service brake; the electropneumatic braking system including at least one brake circuit for the service brake and the holding brake, wherein the service brake and the holding brake may be in separate ones of the at least one brake circuit; the spring brake cylinders being able to be vented when a supply pressure in at least one brake circuit for the service brake decreases; the method including: reducing, via the service brake control unit, the supply pressure in at least one brake circuit for the service brake of the at least one brake circuit under a program control in defined conditions.

In particular, under defined conditions the service brake control unit causes a reduction of the supply pressure in at least one brake circuit for the service brake under program control. The defined conditions are stored in the program of the service brake control unit and can be adapted there to different conditions, for example by installing new software or updates for it. By reduction of the supply pressure in the brake circuit for the service brake, the spring brake cylinders are also vented. The supply pressure is reduced to such an extent that the spring brakes are effective. The method does not rely on the attention and intervention of the driver. The driver should only bring the vehicle to a standstill.

According to a further idea of the disclosure, it may be provided that multiple brake circuits are provided for the service brake and the service brake control unit causes a reduction of the supply pressure in only one brake circuit for the service brake. Preferably, the supply pressure in brake circuits on other axles is maintained. Re-ventilation of the spring brake cylinders is then possible more quickly. The service brake can also continue to be used. Advantageously, the supply pressure in a brake circuit is reduced with controllable valves particularly well suited for venting the brake circuit. In particular, the supply pressure in a brake circuit for a front axle is reduced. However, it is also possible to use a brake circuit for a rear axle, especially if a greater braking effect can be achieved on the front axle and the service brake is to continue to be used there.

According to a further idea of the disclosure, it may be provided that the service brake control unit causes a reduction of the supply pressure in all brake circuits for the service brake. This ensures the venting of the spring brake cylinders to a particularly high degree.

According to a further idea of the disclosure, it may be provided that after the occurrence of at least one of the following conditions the service brake control unit causes a reduction of the supply pressure in at least one brake circuit for the service brake:
- a) the service brake control unit detects a fault in the holding brake system,
- b) due to defined boundary conditions,
- c) after the operation of a separate control element,
- d) after the operation of a brake pedal for the service brake in combination with a detected fault in the holding brake system,
- e) due to a dedicated signal from an additional electronic control unit.

The detection of a fault in the holding brake system can result from a wide variety of events. Also, the defined boundary conditions under which the supply pressure in the brake circuit for the service brake is reduced can be of a variety of types. As a separate control element, a separate control element may be provided in the vehicle/driver's cab, which must be operated additionally, for example after the output of a program-controlled warning signal and/or a program-controlled reduction of the vehicle speed to a standstill. In order to improve safety, the detection of the fault in the holding brake system may also be combined with the operation of a brake pedal for the service brake as a trigger condition for the reduction of the supply pressure in the service brake circuit. Finally, the reduction of the supply pressure in the brake circuit for the service brake can also be due to the dedicated signal of an additional electronic control unit. The control unit may be an electronic control unit of the brake system or outside the brake system.

According to a further idea of the disclosure, it may be provided that the service brake control unit detects a fault in the holding brake system because at least one of the following events has occurred:
- aa) the service brake control unit has an error message from a holding brake control unit,
- ab) the service brake control unit does not have an expected signal from the holding brake control unit,
- ac) the service brake control unit detects a failure of signals on a connected CAN bus.

The holding brake control unit may be configured to allow an error message to be transmitted to the service brake control unit. The holding brake control unit may be configured in such a way that signals are transmitted directly or indirectly to the service brake control unit cyclically or at specified times or event-dependently. Accordingly, the service brake control unit can expect a signal. If this fails, the service brake control unit detects a fault in the holding brake system. The failure of signals can also consist of the fact that a connected CAN bus is no longer transmitting signals. In particular, there is then a so-called CAN timeout.

According to a further idea of the disclosure, it may be provided that for the reduction of the supply pressure in the brake circuit for the service brake due to defined boundary conditions, at least one of the following boundary conditions must be met;
- ba) a dedicated emergency parking signal of a virtual driver,
- bb) a general parking request of a virtual driver to the brake system, in combination with a detected standstill of the vehicle,
- bc) a virtual driver's general parking request to the brake system, in combination with a detected fault in the holding brake system,
- bd) a general parking request of a virtual driver to the electronic brake system, in combination with an inactive compressed air supply.

A virtual driver here should be program-controlled automation that undertakes partial or full control of vehicle functions, corresponding to automation levels 2 to 5. The parking request by the virtual driver is preferably a CAN signal or other electrical signal.

According to a further idea of the disclosure, it may be provided that the service brake control unit deactivates the compressed air delivery into the brake circuits. The aim is to avoid the possibility of an increase in pressure in the brake circuit for the service brake. The subsequent delivery of compressed air into the brake circuit can be carried out by compressed air generation via a compressor or by compressed air delivery from a compressed air supply. Preferably, the compressed air delivery is prevented by shutting down the compressor. However, an indirect shutdown of the compressor is also possible by shutting off the compressed air delivery via a program-controlled switchable valve. After reaching a pressure limit, the compressor switches off automatically. A program-controlled valve can also cut off the delivery of compressed air from a compressed air supply.

According to a further idea of the disclosure, it may be provided that the service brake control unit causes the reduction of the supply pressure in at least one of the brake circuits for the service brake by actuating the service brake. That is, the supply pressure in the brake circuit is reduced by the in particular multiple actuation of the service brake, that is, preferably by multiple ventilation and venting of brake cylinders of the service brake.

According to a further idea of the disclosure, it may be provided that the service brake control unit causes the reduction of the supply pressure in at least one of the brake circuits for the service brake by actuating the service brake, provided that the electronic brake system detects a standstill of the vehicle or a fault in the holding brake system and a brake pedal for the service brake is fully operated for a defined minimum period. The service brake control unit therefore takes into account two secondary conditions. On the one hand, the driver must fully apply the brake pedal for the service brake for a minimum period of time. The minimum period of time is preferably between three and ten seconds or is greater than five seconds. As a second secondary condition, the electronic brake system must detect a standstill of the vehicle or a fault in the holding brake system. When the vehicle is at a standstill, the holding brake can be engaged by operating the brake pedal alone. In the event of a fault in the holding brake system, rapid braking is required anyway.

According to a further idea of the disclosure, it may be provided that the supply pressure in at least one of the brake circuits for the service brake is reduced by venting via a valve in the service brake system. The operation of the service brake is then unnecessary but can remain possible. For venting, a separate valve or a valve which is provided anyway can be used. The latter saves additional cost. If a separate valve is used only for this purpose, functional collisions can be safely avoided. Valves for venting also include valve devices, which in turn have several valves, such as inlet valves and outlet valves.

According to a further idea of the disclosure, it may be provided that the supply pressure in at least one of the brake circuits for the service brake is reduced by venting via a valve for regulating locking prevention. Preferably, it is a so-called ABS solenoid valve, via which the brake pressure in the brake cylinders of the service brake can be reduced. Such valves can also be integrated into a so-called axle modulator.

According to a further idea of the disclosure, it may be provided that the reduction of the supply pressure in at least one of the brake circuits for the service brake is carried out via valves having above-average nominal diameter, in relation to all the valves present in the service brake system. The nominal diameter is advantageously 8 to 12 mm, 9 to 11 mm or 10 mm and refers in particular to venting outlets of the valves. Preferably, it is the already mentioned valves for controlling the anti-locking, in particular on a front axle of the vehicle. The ABS valves are intended to ensure rapid pressure reduction when the wheels are tending to lock and therefore have a relatively large nominal diameter. This circumstance is advantageously used for the venting of the supply pressure in the brake circuit of the service brake.

According to a further idea of the disclosure, it may be provided that in parallel with the reduction of the supply pressure in at least one of the brake circuits for the service brake, at least a part of the service brake system is controlled for braking, in particular another brake circuit. This allows the vehicle to be secured or braked until the holding brake takes effect. In particular, a sufficiently high braking effect should always be ensured.

According to a further idea of the disclosure, it may be provided that at least a part of the service brake system is controlled or is still controlled for braking, and that then the service brake system is vented via at least one valve to reduce the supply pressure in at least one of the brake circuits for the service brake and at least one other valve retains a brake pressure in at least one service brake cylinder so that this brake cylinder is not vented. This allows the vehicle to be held securely even if the spring brakes are not yet effective.

Advantageously, the brake pressure is retained by targeted control of the mentioned ABS valve in the service brake cylinder. Preferably, the brake pressure is retained in all service brake cylinders of an axle or group of axles, while the service brake cylinders of another axle are vented. In many countries, it is customary and prescribed to divide the brake circuit for the service brake into two or more partial brake circuits, at least with one partial brake circuit for the front axle and another partial brake circuit for the rear axle. It is then advantageous to separate according to partial brake circuits, so that the service brake cylinders of one partial brake circuit are vented, while the service brake cylinders of the other partial brake circuit remain ventilated.

According to a further idea of the disclosure, it may be provided that for reducing the supply pressure in at least one of the brake circuits for the service brake the service brake system is vented via at least one valve of a front axle while a brake pressure in at least one service brake cylinder is retained in at least one valve of a rear axle so that this brake cylinder is not vented. This division is advantageous for the braking behavior of the vehicle. Preferably, the brake pressure is retained in all service brake cylinders of the rear axle.

According to a further idea of the disclosure, it may be provided that the reduction of the supply pressure in at least one of the brake circuits for the service brake is carried in a pulsed manner, namely by alternating ventilation and venting of service brake cylinders. In particular, the service brake cylinders are alternately ventilated and vented by operating appropriate intake valves and outlet valves.

According to a further idea of the disclosure, it may be provided that the reduction of the supply pressure in at least one of the brake circuits for the service brake is carried out continuously. This embodiment is particularly advantageous because a permanent braking effect during the reduction of the supply pressure ensures the vehicle standstill better.

The disclosure also relates to an electropneumatic brake system. The brake system is intended for a vehicle and includes a service brake system with a service brake control unit for controlling components of a service brake, a brake circuit for the service brake, a holding brake system with a holding brake and spring brake cylinders, wherein the spring cylinders are vented due to the system when a supply pressure reduces in at least one of the brake circuits for the service brake. In particular, the service brake control unit includes software for carrying out the method, so that a reduction of the supply pressure in at least one of the brake circuits for the service brake can be caused by the service brake control unit under program control in defined conditions.

According to a further idea of the disclosure, it may be provided that compressed air delivery into the brake circuits is deactivated by the service brake control unit. The service brake control unit can influence the delivery of compressed air, in particular by switching off a compressor or by shutting off via a correspondingly controllable valve.

According to a further idea of the disclosure, it may be provided that venting of a brake circuit for the holding brake can be caused by the service brake control unit in conjunction with operation of the brake pedal for the service brake, provided that the electronic brake system detects a standstill of the vehicle or a fault in the holding brake system and the brake pedal for the service brake is fully operated for a defined minimum period. The brake system may have separate brake circuits or partial brake circuits for the service brake and the holding brake. A common brake circuit may also be provided for the holding brake and the service brake.

According to a further idea of the disclosure, at least the brake circuit for the service brake can be vented by controlling a separate valve with simultaneous control of the service brake. While braking is applied with the service brake, the brake circuit is vented via the separate valve.

According to a further idea of the disclosure, the separate valve may be connected to the service brake system. Preferably, the separate valve is connected to the brake circuit for the service brake.

According to a further idea of the disclosure, at least one valve in the brake circuit for the service brake may be controllable for venting at least one of several existing brake circuits. In the case of several existing brake circuits, venting of the spring brake cylinders can be carried out by a known bleed-back function. If there is only one brake circuit, the venting takes place within this brake circuit.

According to a further idea of the disclosure, the holding brake system may include a relay valve with a pilot unit and a check valve for electropneumatic operation of the holding brake, wherein an input of the pilot unit is connected via the check valve to an input of the relay valve. This ensures the desired venting.

According to a further idea of the disclosure, a connection from the input of the pilot control valve to the check valve may be connected to a connection to a brake circuit for the service brake. The desired venting then takes place in the connection to the brake circuit for the service brake.

According to a further idea of the disclosure, it may be provided that the service brake system and the holding brake system are electrically independent of each other, so that in the event of electrical failure of the holding brake system, braking by controlling the service brake system remains possible. This configuration is particularly fail-safe. In particular, a separate power supply is provided for the service brake system.

According to a further idea of the disclosure, a separate control element with a connection to the service brake control unit may be provided and specifically for triggering the program-controlled reduction of the supply pressure in at least one of the brake circuits for the service brake. The control element can be used to initiate a program-controlled sequence of the desired pressure reduction.

BRIEF DESCRIPTION OF DRAWINGS

The invention will now be described with reference to the drawings wherein.

DETAILED DESCRIPTION

Figure 1:
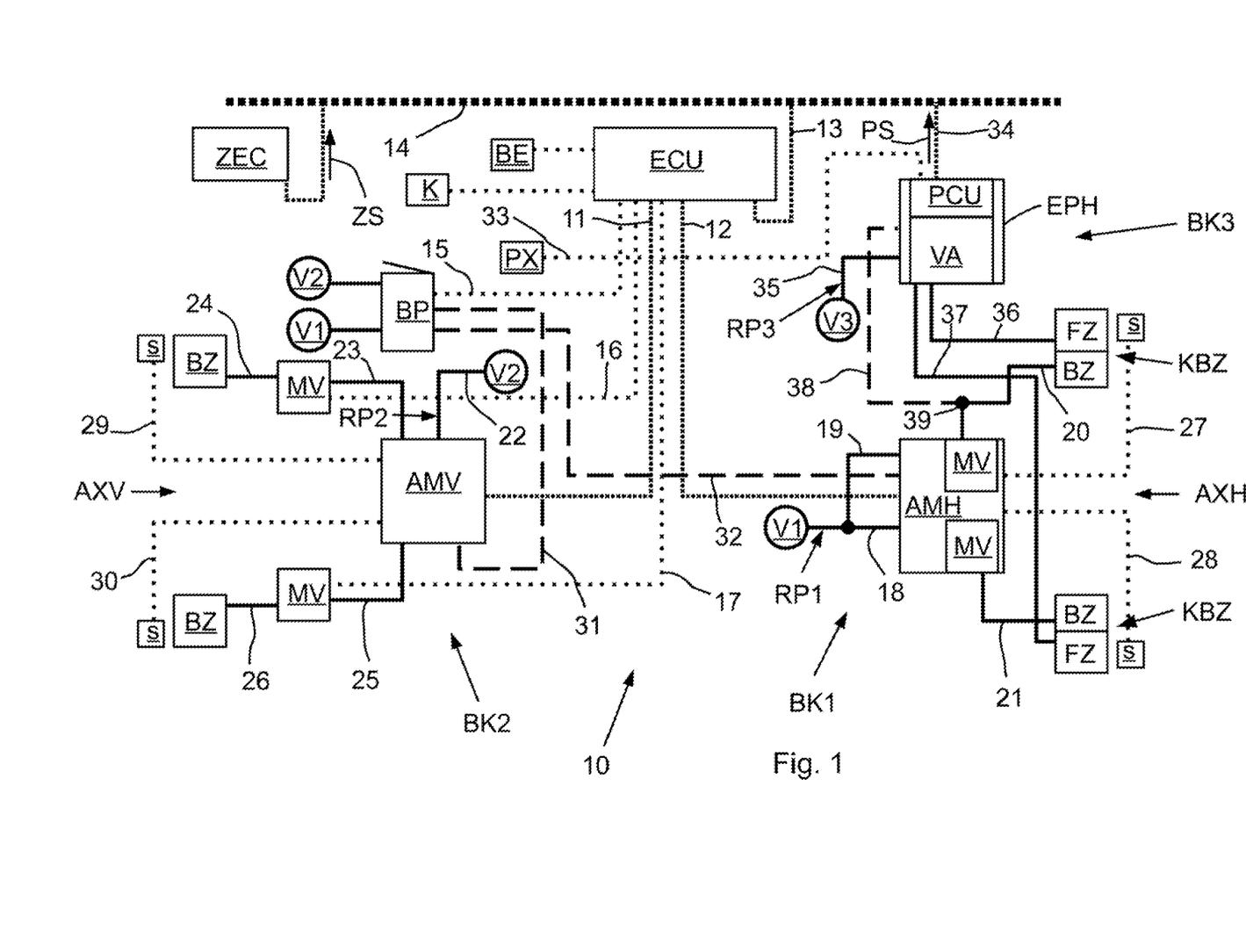
FIG. 1 shows a schematic representation of an electropneumatic brake system for a vehicle.
Figure 4:
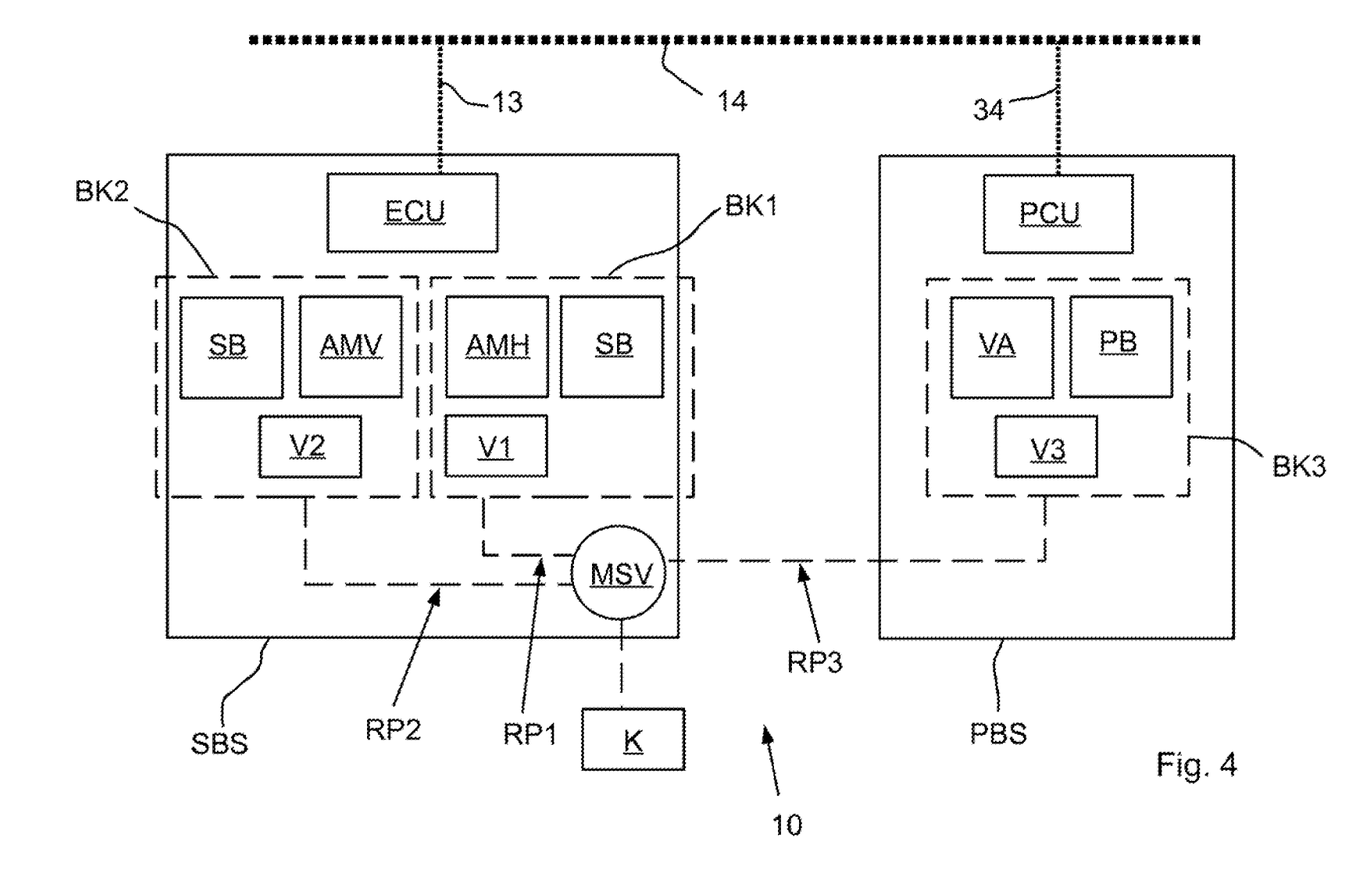
FIG. 4 shows a structural representation of the electropneumatic brake system.
Figure 5:
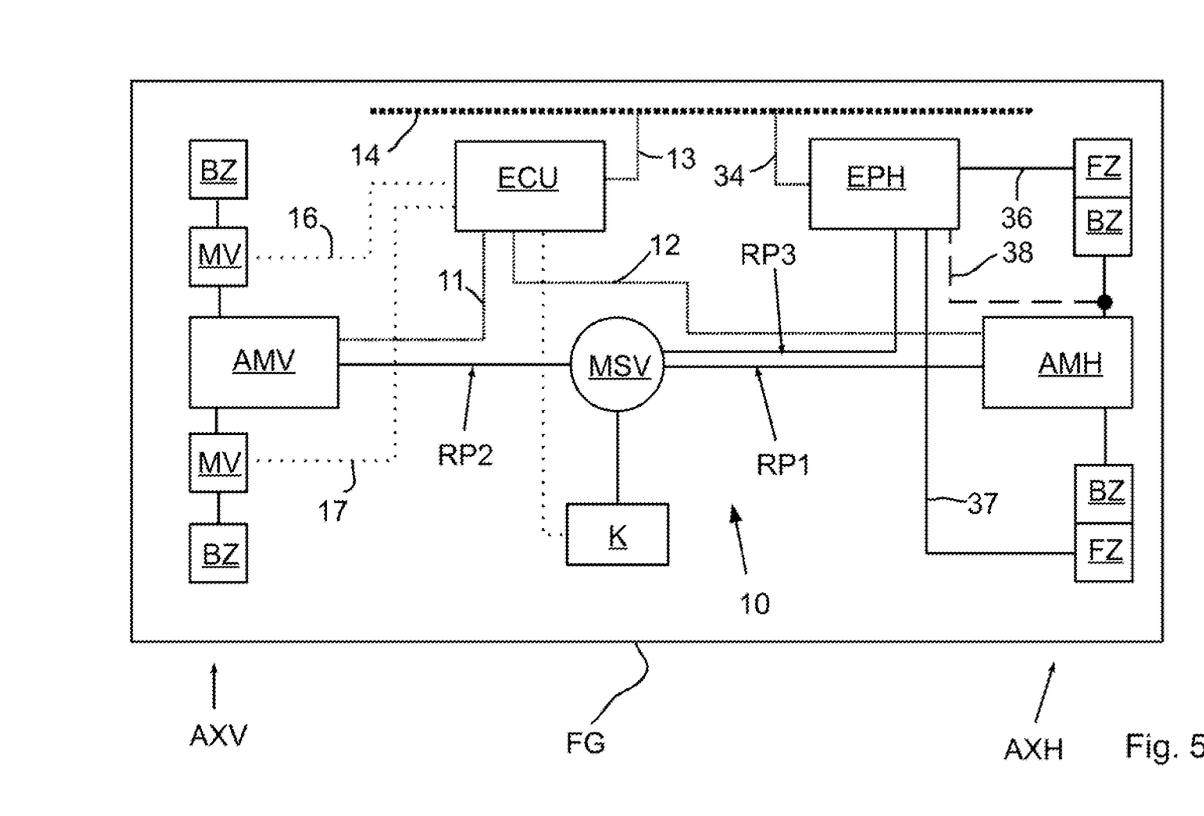
FIG. 5 shows a simplified schematic representation of a vehicle with the brake system according to FIG. 1.

According to the embodiment of FIGS. 1, 4 and 5 an electropneumatic brake system 10 for a vehicle FG, in particular for a truck, includes an electronic brake control unit ECU, which has the function of a service brake control unit here and controls an axle modulator AMV for a front axle AXV and an axle modulator AMH for a rear axle AXH via signal lines 11, 12. The brake control unit ECU is also connected to a vehicle data bus 14 via a signal line 13.

The vehicle data bus 14 is preferably a CAN bus or another vehicle-specific data bus via which electronic devices in the vehicle FG can exchange information and instructions. Accordingly, the signal lines 11 to 13 are preferably CAN connections, with or without a power supply.

The brake control unit ECU is connected to a brake pedal BP and two solenoid valves MV via electrical lines 15, 16, 17. The solenoid valves MV are so-called ABS valves.

The axle modulator AMH for the rear axle AXH is part of a first brake circuit BK1 and receives supply pressure RP1 from a reservoir tank V1 via pneumatic lines 18, 19. Due to the specifications of the brake control unit ECU, a brake pressure is generated in the axle modulator AMH and supplied to combination brake cylinders KBZ via lines 20, 21. A spring brake cylinder FZ of a holding brake PB and a service brake cylinder BZ of a service brake SB are combined in one unit in each combination brake cylinder KBZ in a known manner.

The lines 20, 21 supply the service brake cylinders BZ in the combination brake cylinders KBZ with brake pressure. The axle modulator AMH is of two-channel form here, so that the brake pressures in the lines 20, 21 can be different. The axle modulator AMH also includes valve arrangements for the anti-locking function.

The axle modulator AMV is part of a second brake circuit BK2 and is supplied with supply pressure RP2 from a reservoir tank V2 via a line 22. A brake pressure which is supplied to service brake cylinders BZ via lines 23, 24, 25, 26 and the solenoid valves MV is generated in the axle modulator AMV according to the control by the brake control unit ECU. The axle modulator AMV is a single-channel system here, so that the same brake pressures are controlled in the lines 23, 25. A differentiation of the brake pressures can be carried out via the solenoid valves MV, in particular for locking prevention.

Wheel revolution rate sensors S are connected via lines 27, 28, 29, 30 to the axle modulators AMH and AMV, so that up-to-date information about the actual wheel revolution rates is always available.

In a driver's cab (not shown), a brake pedal BP is located and operated by the driver. The brake pedal BP is connected to the reservoir tank V1 and to the reservoir tank V2. By operating the brake pedal BP, control pressure is supplied to the axle modulators AMH, AMV via pneumatic control lines 31, 32.

The parts described so far are components of a service brake system SBS, which is a sub-system of the electropneumatic brake system 10, see in particular FIG. 4.

Another sub-system is a holding brake system PBS. This is also known as an electronic handbrake. The main component EPH thereof includes an electropneumatic valve arrangement VA with a brake control unit PCU. The brake control unit PCU is connected via an electrical line 33 to a control device PX for a holding brake PB. The control device PX, like the brake pedal BP, is arranged in a driver's cab (not shown).

The brake control unit PCU is connected via a signal line 34 to the data bus 14. The signal line 34 is also preferably a CAN connection. The valve arrangement VA is part of a third brake circuit BK3 and is supplied via a pneumatic line 35 with supply pressure RP3 from a reservoir tank V3.

The task of the brake control unit PCU is to control the ventilation and venting of the spring brake cylinders FZ in the combination brake cylinders KBZ. For this purpose, the combination brake cylinders KBZ are connected to the valve arrangement VA via pneumatic lines 36, 37. In addition, brake pressure from the axle modulator AMH for the rear axle AXH is supplied to the valve arrangement VA via a pneumatic control line 38 as a control pressure, see also connection point 39 between the lines 20, 38.

The three brake circuits BK1, BK2, BK3 (with the respective reservoir tanks V1, V2, V3) are preferably connected to each other according to FIG. 4 via a multi-circuit protection valve MSV, so that a pressure reduction of the supply pressure RP1, RP2, RP3 in one of the brake circuits does not automatically cause a sharp reduction in pressure in one of the other brake circuits. However, a so-called bleed-back function is provided in a known manner from the third brake circuit BK3 to at least one of the two other brake circuits BK1, BK2. This ensures that a sharp reduction in pressure in the first brake circuit BK1 or second brake circuit BK2 also causes a pressure reduction in the third brake circuit BK3, so that the spring brake cylinders FZ are vented.

Alternatively, the brake circuits BK1, BK2, BK3 can also be partial brake circuits of a single larger brake circuit. Accordingly, supply pressure is only supplied by a reservoir (not shown).

The brake system 10 is intended for a motor vehicle and contains further components for connecting a trailer brake system. For reasons of clarity, these components are not shown here. The same applies to possible additional brake circuits for other consumers or pneumatic devices.

Figure 2:
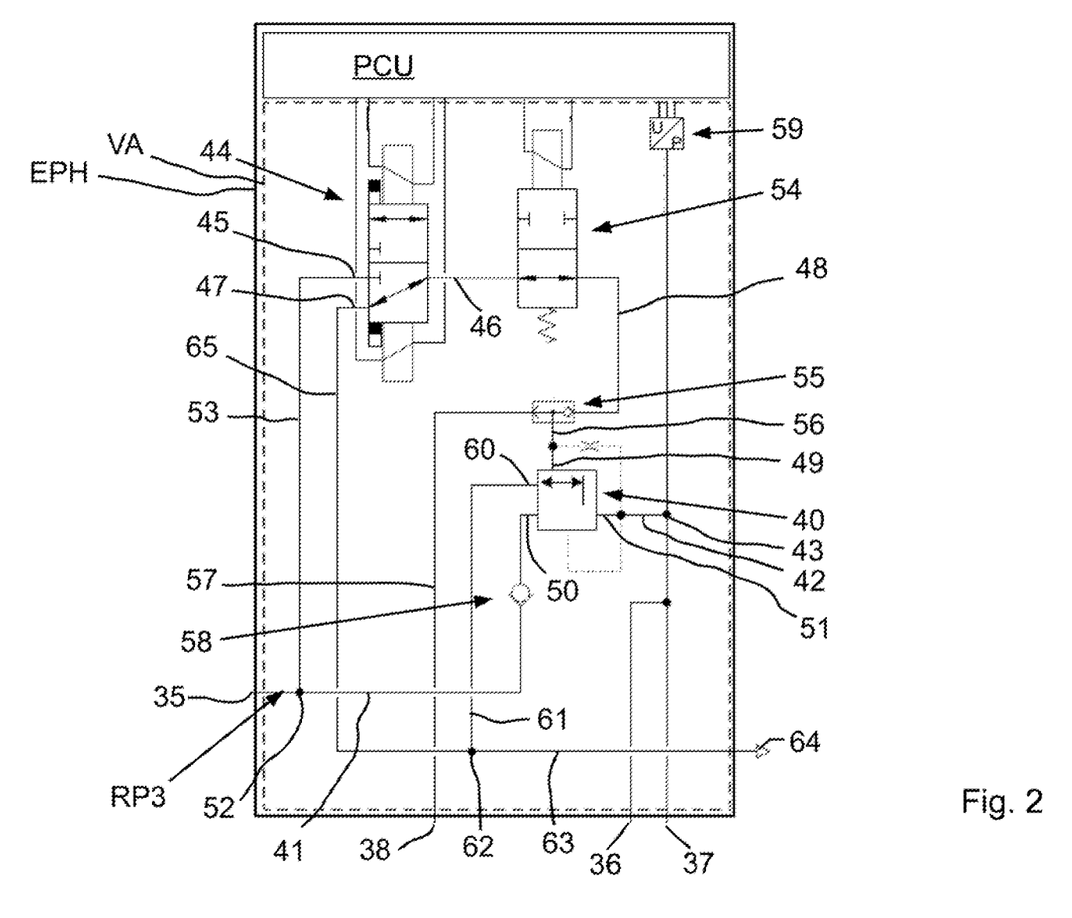
FIG. 2 shows a circuit diagram with electropneumatic components of a holding brake system.

The valve arrangement VA of the holding brake system PBS is explained in more detail below based on FIG. 2.

A pneumatic relay valve 40 is supplied with supply pressure RP3 from V3 via the line 35 and an internal line 41. On the output side, the relay valve 40 feeds an internal line 42 with a connection 43 to the lines 36, 37, which lead to the spring brake cylinders FZ.

To control the relay valve 40, a pilot control unit 44 is provided, which is in the form here of an electromagnetically controllable 3/2-way valve and has an input 45, an output 46 and a venting output 47. In FIG. 2, the relay valve 40 is shown in the venting position or blocking position, in which the output 46 and the venting outlet 47 are connected to each other. In a conducting position (not shown), the input 45 and the output 46 are connected to each other, so that control pressure can be supplied to a control input 49 of the relay valve 40 via an internal line 48. Depending on the control pressure, a pressure applied to the input 50 is fed into the internal line 42 via an output 51. The internal line 41 connected to the input 50 is connected via a connection 52 to the line 35 and a line 53 to the input 45.

The pilot control unit 44 is followed here by a 2/2-way valve, which allows modulation of the pressure in the internal line 48 and is of minor importance in connection with the present disclosure. For simplicity, it is assumed that the 2/2-way valve 54 is in the conducting position shown in FIG. 2.

If the line 35 is subjected to supply pressure RP3 and the pilot control unit 44 is in the conducting position (not shown), the relay valve 40 is controlled to the conducting position, so that the spring brake cylinders FZ are ventilated via the lines 36, 37.

Between the control input 49 and the internal line 48, a changeover valve 55 is provided (also referred to as an OR valve). The output 56 thereof is connected to the control input 49. In addition to the internal line 48, the changeover valve 55 is supplied from an internal line 57 which is connected to the control line 38. Via the changeover valve 55, service brake pressure can be supplied to the relay valve 40 as a control pressure, so that the spring brake cylinders FZ are ventilated to approximately the same extent as the service brake cylinders BZ. In this way, mechanical overloading of the combination brake cylinders KBZ and the interacting components is avoided.

In the internal line 41, a check valve 58 is provided between the input 50 and the connection 52, which prevents backflow to the connection 52. Due to the arrangement of the check valve 58 between the connection 52 and the relay valve 40, a backflow from the relay valve 40 to the input 45 of the pilot control unit 44 is also not possible.

The pilot control unit 44 and the 2/2-way valve 54 can be controlled by the brake control unit PCU. Here, the pilot control unit 44 is in the form of a bistable switching element. In contrast, the 2/2-way valve 54 is de-energized in its conducting position and only changes to its blocking position after energization. Finally, a pressure sensor 59 connected to the brake control unit PCU detects the pressure after the output 51 of the relay valve 40.

The relay valve 40 still includes a venting outlet 60, which leads to a venting outlet 64 of the valve arrangement VA via an internal line 61, a connection 62 and an internal line 63. In addition, the venting outlet 47 is connected to the line 63 via an internal line 65 and the connection 62. In the venting position of the pilot control unit 44 shown in FIG. 2 the spring brake cylinders FZ can vent via the relay valve 40.

Figure 3:
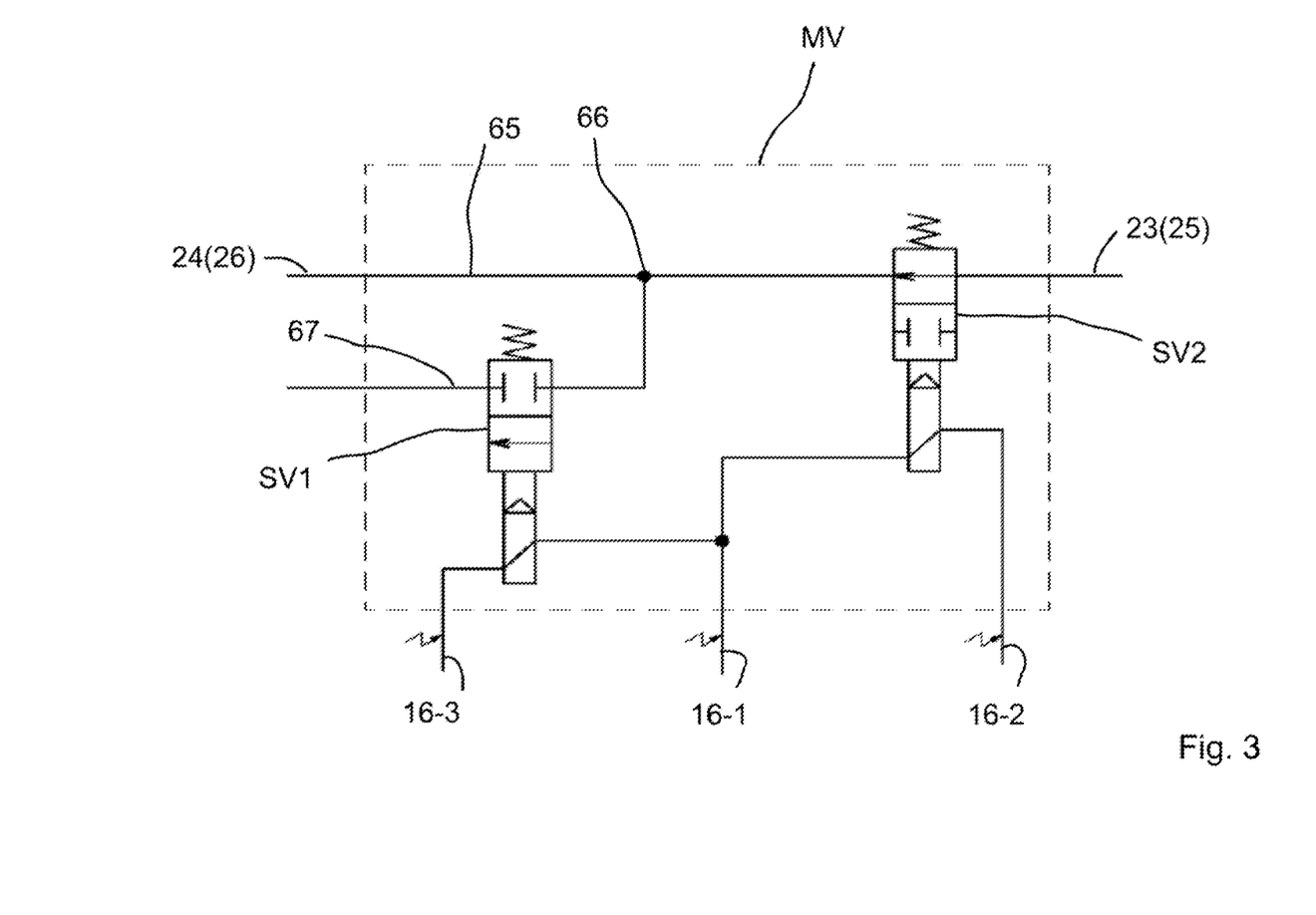
FIG. 3 shows a valve assembly within a service brake system.

FIG. 3 shows the configuration of one of the solenoid valves MV. In particular, it is a valve arrangement with two electromagnetic switching valves SV1, SV2. Here, both switching valves are in the form of 2/2-way valves. The switching valve SV2 connects the pneumatic lines 23, 24 or 25, 26 in the conducting position. The switching valve SV2 can be used for modulation of the brake pressure.

The switching valve SV1 is connected to an internal line 65 between the switching valve SV2 and the line 24 or 26, see also connection 66. The switching valve SV1 is de-energized in the blocking position, while the switching valve SV2 is de-energized in the conducting position.

Venting of the brake pressure in the line 24 or 26 is possible via the switching valve SV1 and its outlet 67 in the conducting position. This function is required in conjunction with locking prevention. Likewise, venting via the output 67 can be used in connection with the present disclosure.

The two switching valves SV1 and SV2 are controlled by the brake control unit ECU, see electrical lines 16'1, 16'2, 16'3, which are combined in FIG. 1 as line 16.

In the present context, the brake control unit ECU is regarded as the control unit of the service brake system SBS, whereas the brake control unit PCU is the control unit of the holding brake system PBS. Among other things, special software is provided in the brake control unit ECU for the emergency engagement of the holding brakes PB by indirect venting of the spring brake cylinders FZ. The reduction is carried out under program control only via the brake control unit ECU of the service brake system SBS. This means that the brake control unit PCU is bypassed in this case or remains inactive or has failed anyway.

The holding brake PB is activated by a reduction of the supply pressure RP3 in the third brake circuit BK3 due to the reduction of the supply pressure RP1, RP2 in the first or second brake circuit BK1, BK2 of the service brake system SBS. This is made possible by connecting the brake circuit BK3 for the holding brake PB to the brake circuits BK1, BK2 for the service brake SB in conjunction with the so-called bleed back function or if the brake circuits BK1, BK2, BK3 mentioned are only connected partial brake circuits of a common brake circuit anyway. Preferably, the brake circuits BK1, BK2, BK3 are connected via a multi-circuit protection valve MSV, which can also have the bleed-back functionality.

The brake control unit ECU reduces the supply pressure RP1, RP2 in the brake circuit BK1 or BK2 for the service brake SB under specially provided secondary conditions BEL BE2, BE3 and in particular in connection with a standstill of the vehicle FG, for example:

1. the brake control unit PCU reports a malfunction via the data bus 14;
2. the brake control unit ECU expects regular status messages PS from the brake control unit PCU but does not receive any within a defined period of time;
3. another electronic control unit ZEC of the vehicle FG connected to the data bus 14 transmits a dedicated signal ZS to the brake control unit ECU;

4. the vehicle has automation functions in the so-called automation level 2, 3, 4 or 5 and in the context of these functions the brake control unit ECU is controlled to engage the holding brakes PB;
5. a virtual driver provided in the context of automation (as part of the software for control) sends a corresponding request to the brake control unit ECU via the data bus 14.

The reduction of the supply pressure RP1, RP2 in the brake circuit BK1, BK2 for the service brake SB can be carried out in different ways. Preferably, the supply of compressed air from a compressed air source, in particular a compressor K, is first interrupted. Subsequently, or in parallel with this, the service brake SB is operated in order to consume compressed air and reduce the supply pressure in the brake circuit BK1, BK2. Typically, the compressed air consumption takes place when the service brakes SB are released. The service brake cylinders BZ are then vented, for example via the solenoid valves MV, in particular the switching valve SV1, or in the axle modulators AMV, AMH.

It is also possible to vent the brake circuit BK1, BK2 for the service brake SB under program control without prior operation of the same, namely also via the switching valve SV1. Venting via this valve SV1 is particularly favorable, since the cross-sections provided here are relatively large due to the function as an ABS valve.

Parallel ventilation and venting in the area of the same service brake cylinder BZ is also possible. If brake pressure is controlled into the solenoid valve MV by the axle modulator AMV via the line 23, so that the service brake cylinder BZ is ventilated via the line 24, the switching valve SV1 can be switched to its conducting position. A dynamic pressure then forms in the line 24 with a residual braking effect, while at the same time venting takes place via the switching valve SV1. As a result, the service brake SB is at least partially active, while the brake pressure in the brake circuit BK2 is reduced and the spring brake cylinders FZ are vented.

Separate control after the brake circuits BK1, BK2 or the axles AXV, AXH is also possible. For example, the axle modulator AMH for the rear axle is controlled by the brake control unit ECU for ventilating the service brake cylinders BZ, while venting of the brake circuit BK2 takes place via the solenoid valves MV and the switching valves SV1 thereof. As a result of this ventilation, the brake circuit BK3 is also depressurized and the spring brake cylinders FZ are vented.

Especially with separate brake circuits BK1, BK2 in the service brake system SBS, an overlap of the braking effects of the service brake system SBS and the holding brake system PBS can be achieved. The vehicle FG is braked or held by a brake circuit BK1 of the service brake system SBS, while the venting of the other brake circuit BK2 causes venting of the brake circuit BK3 of the holding brake system PBS.

In FIG. 4, the division into brake circuits BK1, BK2, BK3 and their assignment to the service brake system SBS and the holding brake system PBS can be seen, as well as the connection of the brake circuits BK1, BK2, BK3 via the multi-circuit protection valve MSV. The latter is not shown in FIG. 1 only for reasons of clarity.

The compressor K fills the reservoir tanks V1, V2, V3 via the multi-circuit protection valve MSV. The reservoir tanks V1, V2, V3 are not shown in FIG. 5 for simplicity.

Figure 6:
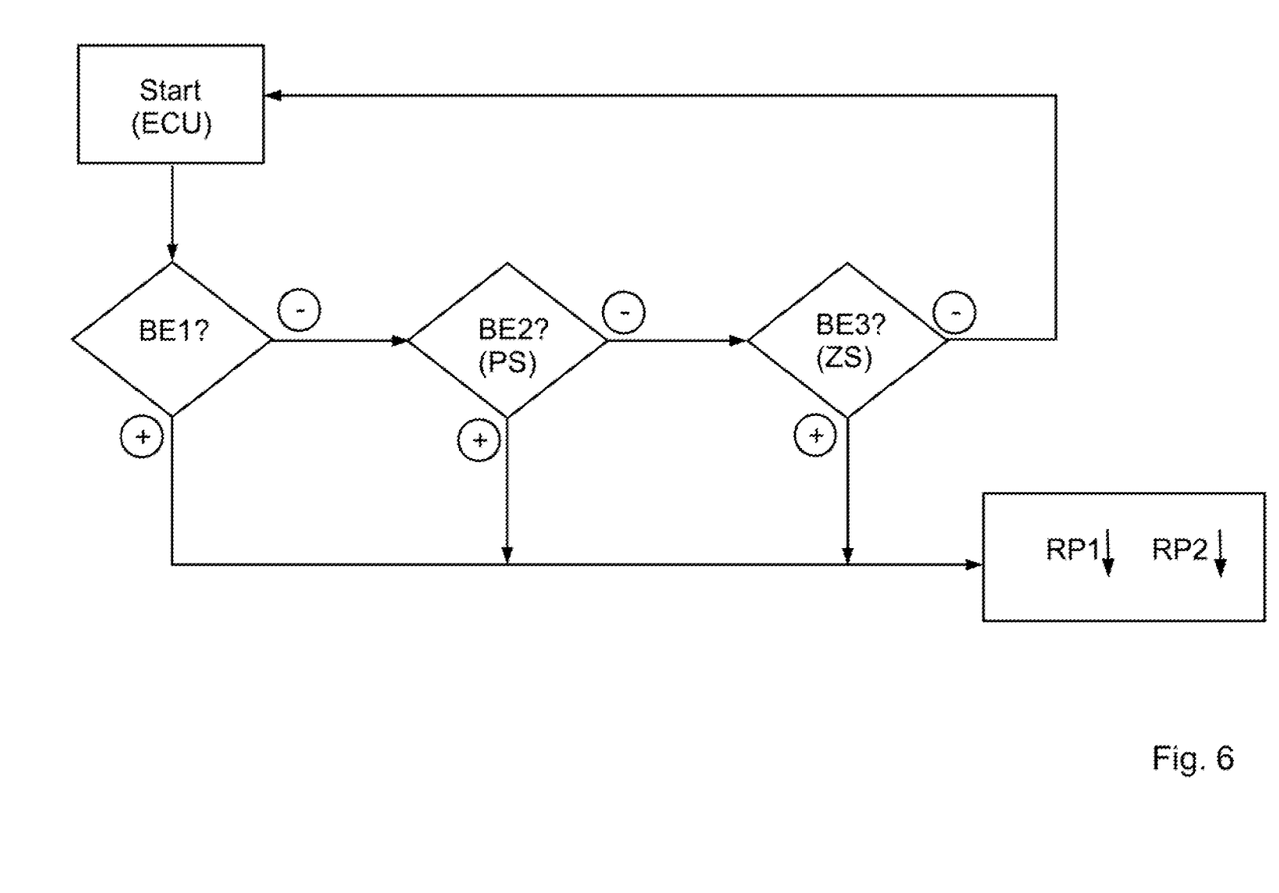
FIG. 6 shows a simplified representation of logic for condition testing in the brake system.
Figure 7:
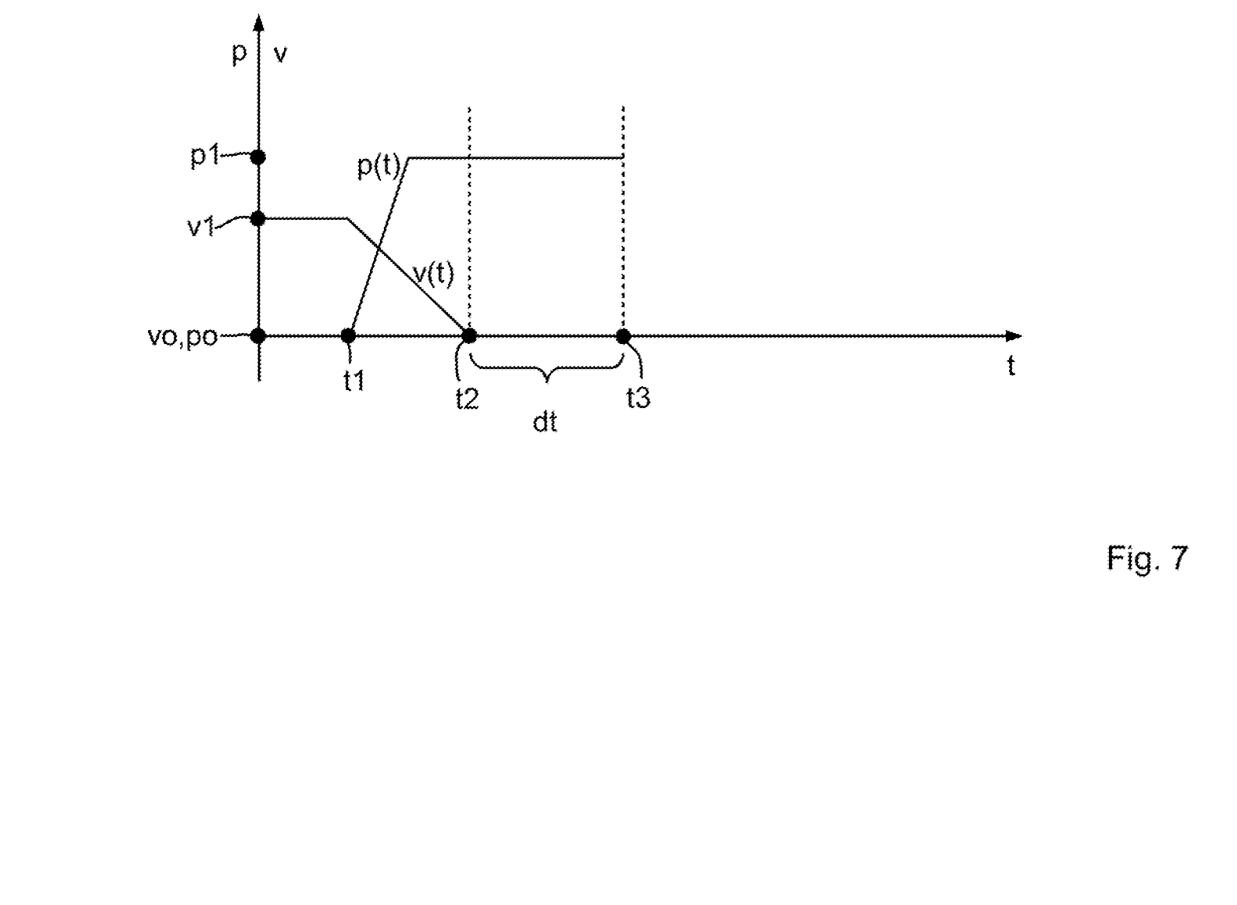
FIG. 7 shows a simplified representation of a brake pressure after the operation of a brake pedal in connection with a vehicle speed; and, FIG. 8 shows a simplified representation of a brake pressure curve for reducing a supply pressure in a brake circuit.
Figure 8:
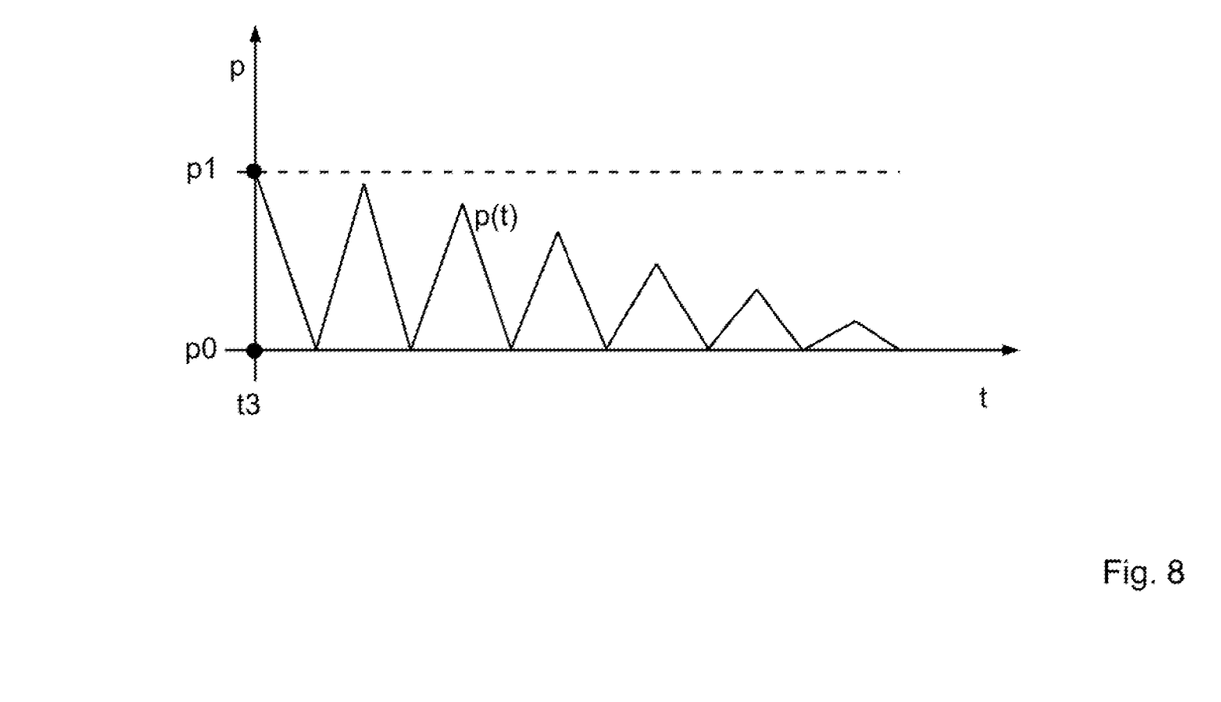

A possible procedure is explained based on FIGS. 6 to 8:

In the brake control unit ECU of the service brake system SBS it is continuously monitored by suitable software whether at least one of multiple stored secondary conditions BE1, BE2, BE3 has occurred. If so, the brake control unit ECU controls measures to reduce the supply pressure RP1, RP2 in the brake circuits BK1, BK2. A so-called secondary condition BE1, BE2, BE3 can also contain a group of conditions that must be fulfilled at the same time.

For example, the secondary condition BE1 in FIG. 6 contains the conditions
1. Vehicle standstill, corresponding to speed v=v0=0 and
2. Brake pedal fully depressed for a period of time after vehicle standstill, corresponding to brake pressure p=p1.

If these two conditions are met, the supply pressure RP1, RP2 is reduced by the brake control unit ECU. The brake control unit ECU receives a signal representing the speed from the wheel revolution rate sensors S or via the data bus 14. The brake pressure p can be provided by a pressure sensor (not shown) in the brake circuit BK1 or BK2.

FIG. 7 shows that the driver operates the service brake SB at time t1 due to a warning signal, as a result of which the brake pressure p increases from p0 to p1 and in parallel with this the speed of the vehicle FG reduces from v1 to v0 (standstill). Despite the standstill reached at time t2, the driver continues to brake with full brake pressure p1.

At the end of the time dt=t3−t2 the mentioned conditions are fulfilled. The brake control unit ECU detects this, deactivates the compressor K and, for example, controls the axle modulators AXH and AXV in a pulsed manner, so that the service brake cylinders BZ are ventilated and vented in a pulsed manner while the vehicle FG is stationary. As a result, the supply pressure in the brake circuits BK1, BK2 reduces, as does the possible brake pressure p, as shown in FIG. 8.

As a result of the bleed back function provided in the multi-circuit protection valve MSV, the supply pressure RP3 in the holding brake circuit BK3 also reduces and the spring brake cylinders FZ are vented. The holding brake PB is effective without being operated by the driver.

The secondary condition BE2 in FIG. 6 may refer, for example, to a signal PS of the brake control unit PCU. Either the signal PS represents a fault in itself detected by the brake control unit PCU, which is transmitted to the brake control unit ECU, or it is a cyclical status signal, the absence of which triggers an action of the brake control unit ECU.

The secondary condition BE3 in FIG. 6 may refer, for example, to a signal ZS of the additional control unit ZEC connected to the data bus 14, such as an engine control unit.

The reduction of the supply pressure RP1, RP2 in the service brake system SBS can be achieved in different ways. One possibility is the fastest possible venting of all brake circuits BK1, BK2. Another option is to vent only one brake circuit BK2 or BK1, while the other brake circuit BK1 or BK2 is not vented. Another option is differentiation within a brake circuit BK1, BK2. For example, in the brake circuit BK2 of the front axle AXV, a service brake cylinder BZ is kept ventilated, that is, braked, while venting via the solenoid valve MV of the other service brake cylinder BZ, that is, the supply pressure RP2 is reduced.

It is understood that the foregoing description is that of the preferred embodiments of the invention and that various changes and modifications may be made thereto without departing from the spirit and scope of the invention as defined in the appended claims.

REFERENCE SIGN LIST (PART OF DESCRIPTION)

10 electropneumatic brake system
11 signal line 12 signal line
13 signal line
14 data bus
15 electrical line
16 electrical line
16'1 electrical line
16'2 electrical line
16'3 electrical line
17 electrical line
18 pneumatic line
19 pneumatic line
20 pneumatic line
21 pneumatic line
22 pneumatic line
23 pneumatic line
24 pneumatic line
25 pneumatic line
26 pneumatic line
27 electrical line
28 electrical line
29 electrical line
electrical line
31 pneumatic control line
32 pneumatic control line
33 electrical line
34 signal line
pneumatic line
36 pneumatic line
37 pneumatic line
38 pneumatic control line
39 connection
relay valve
41 internal line
42 internal line
43 connection
44 pilot control unit
input
46 output
47 venting output
48 internal line
49 control input
50 input
51 output
52 connection
53 internal line
54 2/2-way valve
55 changeover valve
56 output
57 internal line
58 check valve
59 pressure sensor
60 venting output
61 internal line
62 connection
63 internal line
64 venting output
65 internal line
66 connection
67 output
AMH rear axle axle modulator
AMV front axle axle modulator
AXH rear axle
AXV front axle
BE control element
BE1 1st condition
BE2 2nd condition
BE3 3rd condition BK1 brake circuit
BK2 brake circuit
BK3 brake circuit
BP brake pedal
BZ service brake cylinder
ECU brake control unit
EPH main component
FG vehicle
FZ spring brake cylinder
K compressor
KBZ combination brake cylinder
MSV multi-circuit protection valve
MV solenoid valve
PB holding brake
PBS holding brake system
PCU brake control unit
PS signal
PX operating device
RP1 supply pressure brake circuit BK1
RP2 supply pressure brake circuit BK2
RP3 supply pressure brake circuit BK3
S wheel revolution rate sensors
SB service brake
SBS service brake system
SV1 switching valve
SV2 switching valve
VA valve arrangement
V1 reservoir tank brake circuit BK1
V2 reservoir tank brake circuit BK2
V3 reservoir tank brake circuit BK3
ZEC additional control unit
ZS signal

The invention claimed is:

1. A method for emergency engagement of a holding brake of a vehicle having an electropneumatic brake system including a service brake system with a service brake and a holding brake system with the holding brake; the holding brake system having spring brake cylinders; the service brake system including a service brake control unit for controlling components of the service brake; the electropneumatic braking system including at least one brake circuit for the service brake and the holding brake, wherein the service brake and the holding brake may be in separate ones of said at least one brake circuit; the spring brake cylinders being able to be vented when a supply pressure in the at least one brake circuit for the service brake decreases; the method comprising:
reducing, via the service brake control unit, the supply pressure in at least one brake circuit for the service brake of the at least one brake circuit under a program control in defined conditions.

2. The method of claim 1, wherein the at least one brake circuit includes a plurality of brake circuits for the service brake and the service brake control unit is configured to cause a reduction of the supply pressure in only one of the plurality of brake circuits.

3. The method of claim 1, wherein the service brake control unit causes a reduction of the supply pressure in all of the at least one brake circuit for the service brake.

4. The method of claim 1, wherein the service brake control unit causes a reduction of the supply pressure in at least one of the at least one brake circuit for the service brake after an occurrence of at least one condition including:
a) the service brake control unit detects a fault in the holding brake system;
b) due to defined boundary conditions;
c) after the operation of a separate control element;

d) after the operation of a brake pedal for the service brake in combination with the detected fault in the holding brake system; and,
e) due to a dedicated signal of an additional electronic control unit.

5. The method of claim 4, wherein the service brake control unit detects the fault in the holding brake system because of an occurrence of at least one event including:
   aa) the service brake control unit has an error message from a holding brake control unit;
   ab) the service brake control unit does not have an expected signal from the holding brake control unit; and,
   ac) the service brake control unit detects a failure of signals on a connected CAN bus.

6. The method of claim 4, wherein for the reduction of the supply pressure in the brake circuit for the service brake due to the defined boundary conditions, at least one of the following boundary conditions must be met:
   ba) a dedicated emergency parking signal of a virtual driver;
   bb) a general parking request of the virtual driver to the brake system, in combination with a detected standstill of the vehicle;
   bc) the general parking request of the virtual driver to the brake system, in combination with the detected fault in the holding brake system; and,
   bd) the general parking request of the virtual driver to the electropneumatic brake system, in combination with inactive compressed air delivery.

7. The method of claim 1, wherein the service brake control unit is configured to deactivate compressed air delivery into the at least one brake circuit.

8. The method of claim 1, wherein the service brake control unit causes the reduction of the supply pressure in at least one of the at least one brake circuit for the service brake by operating the service brake.

9. The method of claim 8, wherein the service brake control unit causes the reduction of the supply pressure in the at least one of the at least one brake circuit for the service brake by operating the service brake if the electronic brake system detects a vehicle standstill or a fault in the holding brake system and a service brake pedal is fully actuated for a defined minimum period.

10. The method of claim 1, wherein the supply pressure in at least one of the at least one brake circuit for the service brake is reduced by venting via a valve in the service brake system.

11. The method of claim 10, wherein the supply pressure in the at least one of the at least one brake circuit for the service brake is reduced by venting via a valve for regulating locking prevention.

12. The method of claim 1, wherein the reduction of the supply pressure in at least one of the at least one brake circuit for the service brake is carried out via valves with an above-average nominal diameter in relation to all valves present in the service brake system.

13. The method of claim 1, wherein, in parallel with the reduction of the supply pressure in at least one of the at least one brake circuit for the service brake, at least a part of the service brake system is controlled for braking.

14. The method of claim 1, wherein the service brake system includes at least one service brake cylinder; and, at least a part of the service brake system is controlled or is still controlled for braking, and then the service brake system is vented via at least one valve for reduction of the supply pressure in at least one of the at least one brake circuit for the service brake and, at one or more other valves, a brake pressure is retained in at least one of the at least one service brake cylinder so that said service brake cylinder is not vented.

15. The method of claim 14, wherein, for reduction of the supply pressure in the at least one of the at least one brake circuit for the service brake, the service brake system is vented via at least one valve on a front axle and, at one or more valves of a rear axle, a brake pressure in at least one of the at least one service brake cylinder is retained so that said service brake cylinder is not vented.

16. The method of claim 1, wherein the reduction of the supply pressure in at least one of the at least one brake circuit for the service brake is pulsed, namely by alternating ventilation and venting of service brake cylinders.

17. The method of claim 1, wherein the reduction of the supply pressure in at least one of the at least one brake circuit for the service brake is carried out continuously.

18. A service brake control unit comprising:
   a processor;
   a computer readable non-transitory storage medium having program code stored thereon;
   said program code being configured, when executed by said processor, to carry out the method of claim 1.

19. An electropneumatic brake system for a vehicle, the electropneumatic brake system comprising:
   a service brake system including a service brake control unit for controlling components of a service brake;
   at least one brake circuit for the service brake;
   a holding brake system including a holding brake and spring brake cylinders;
   said spring brake cylinders being configured to be vented when a supply pressure in at least one of the at least one brake circuit for the service brake reduces;
   said service brake control unit including software configured, when executed by a processor, to reduce the supply pressure in the at least one of the at least one brake circuit for the service brake under a program control in defined conditions.

20. The electropneumatic brake system of claim 19, wherein said service brake control unit is configured to deactivate a compressed air delivery into the at least one brake circuit.

21. The electropneumatic brake system of claim 19, wherein said service brake control unit is configured to cause a venting of a holding brake circuit for the holding brake in conjunction with an operation of a service brake pedal for said service brake provided that the electropneumatic brake system detects a vehicle standstill or a fault in said holding brake system and said service brake pedal is fully operated for a defined minimum period.

22. The electropneumatic brake system of claim 19, wherein said at least one brake circuit for the service brake includes a first brake circuit configured to be vented by controlling a separate valve with simultaneous control of said service brake.

23. The electropneumatic brake system of claim 22, wherein said separate valve is connected to said service brake system.

24. The electropneumatic brake system of claim 19, further comprising:
   at least one valve in the at least one brake circuit for the service brake;
   the electropneumatic brake system including a multiplicity of brake circuits; and, said at least one valve being configured to be controlled for venting at least one of said multiplicity of brake circuits.

25. The electropneumatic brake system of claim 19, wherein said holding brake system is configured for electropneumatic actuation of said holding brake and includes a relay valve with a pilot control unit and a check valve; and, said pilot control unit having an input is connected to an input of said relay valve via said check valve.

26. The electropneumatic brake system of claim 25, wherein a connection from said input of said pilot control unit to said check valve is connected to a connection of a holding brake circuit for the holding brake.

27. The electropneumatic brake system of claim 19, wherein said service brake system and the holding brake system are electrically independent of each other so that, in an event of electrical failure of said holding brake system, braking by controlling said service brake system remains possible.

28. The electropneumatic brake system of claim 19, further comprising a separate operating element having a connection to said service brake control unit and being configured to trigger the program-controlled reduction of the supply pressure in at least one of the at least one brake circuit for the service brake.

29. A vehicle comprising the electropneumatic brake system of claim 19.

* * * * *